United States Patent [19]
Lyon et al.

[11] Patent Number: 5,636,966
[45] Date of Patent: Jun. 10, 1997

[54] CASE PICKING SYSTEM

[75] Inventors: Robert G. Lyon, South Jordan; James D. Larsen, Ogden; Wesley A. Cox, West Jordan, all of Utah

[73] Assignee: HK Systems, Inc., Brookfield, Wis.

[21] Appl. No.: 957,697

[22] Filed: Oct. 7, 1992

[51] Int. Cl.[6] .................................................. B65G 57/00
[52] U.S. Cl. ........................................ 414/791.6; 414/789.6
[58] Field of Search .......................... 198/347.1; 414/788.4, 414/789.6

[56] References Cited

U.S. PATENT DOCUMENTS

| 3,262,584 | 7/1966 | Hayford, Jr. et al. | 414/792 |
| 3,517,831 | 6/1970 | Hahn | 414/789.6 |
| 4,621,745 | 11/1986 | Grace | 193/40 X |

FOREIGN PATENT DOCUMENTS

| 209116 | 1/1987 | European Pat. Off. | 198/347.1 |
| 248782 | 8/1987 | German Dem. Rep. | |
| 4021665 | 1/1992 | Germany | |
| 2107690 | 5/1983 | United Kingdom | 414/789.6 |

*Primary Examiner*—Karen B. Merritt
*Assistant Examiner*—Janice L. Krizek
*Attorney, Agent, or Firm*—Nilles & Nilles, S.C.

[57] ABSTRACT

An automated order picking system assembled from known, available components and that includes a manager computer to receive orders for goods from a customer and to break the order down into requested full pallets of multiple ordered layers of goods; layers of goods ordered by the customer; compatible ordered layers of goods that can be combined into full pallets; and compatible cases of ordered goods that can be formed into layers and into full pallets of multiple layers of goods; and vertical cells for receiving, storing and delivering cases of the goods. The vertical cells comprise towers having mutually facing tower sections that receive goods delivered to feed conveyors by gantry robots having end effectors capable of handling the goods and the tower sections passing the goods back and forth as the goods are moved downwardly for placement on the discharge conveyor under the control of a programmable logic computer. The full pallets, full layers and cases of goods are conveyed to a palletizer to be organized into the requested orders.

24 Claims, 7 Drawing Sheets

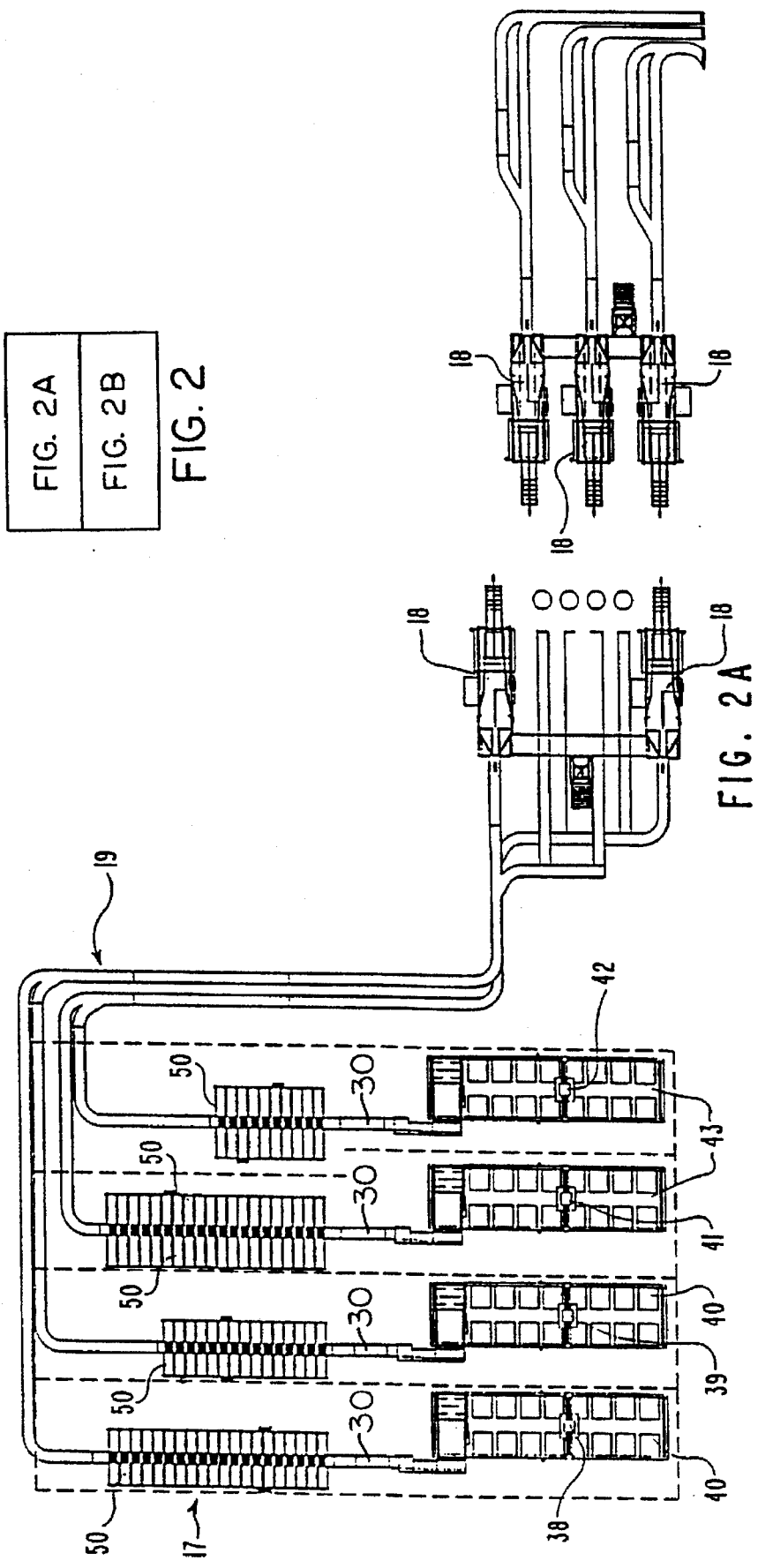

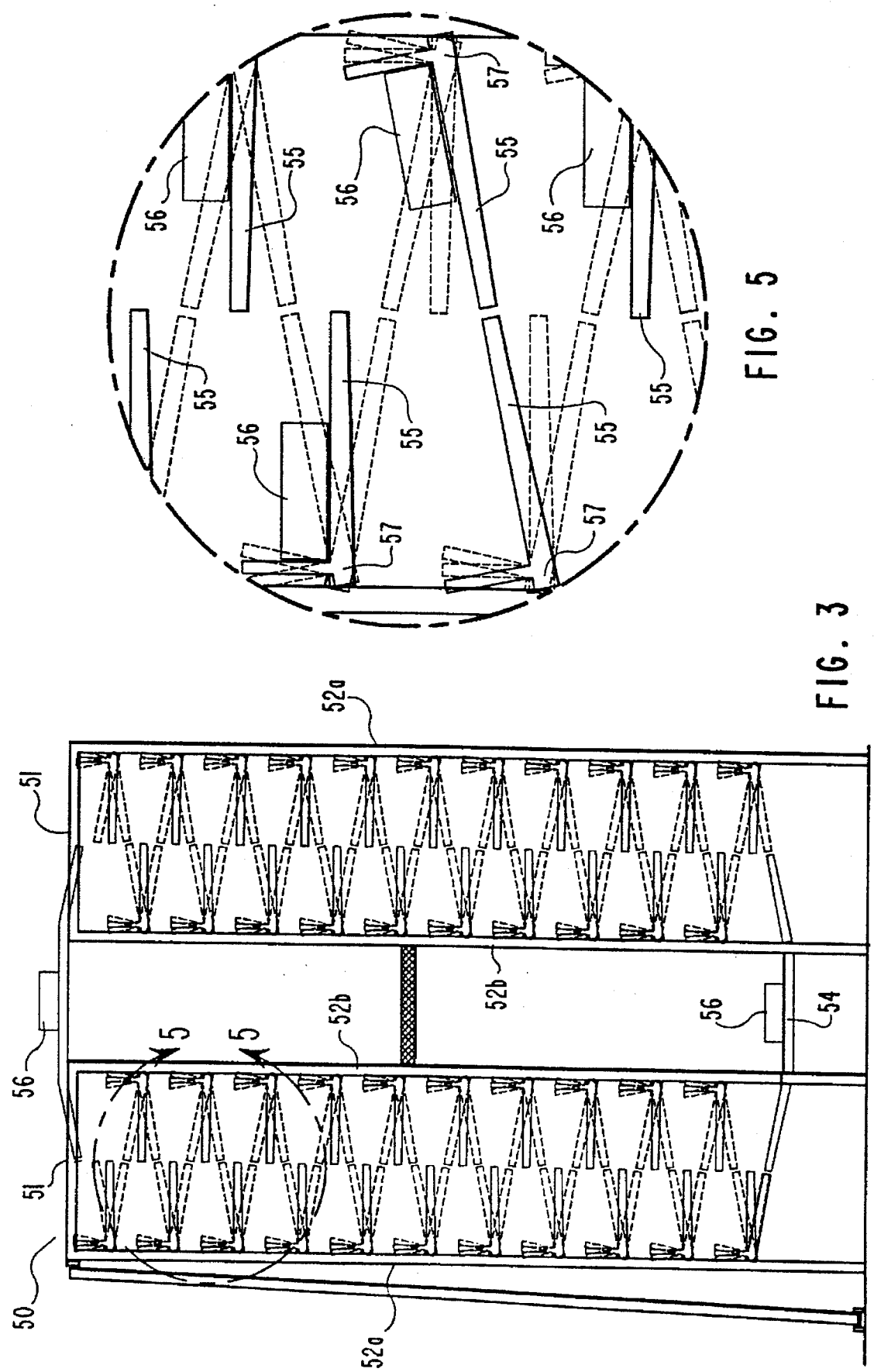

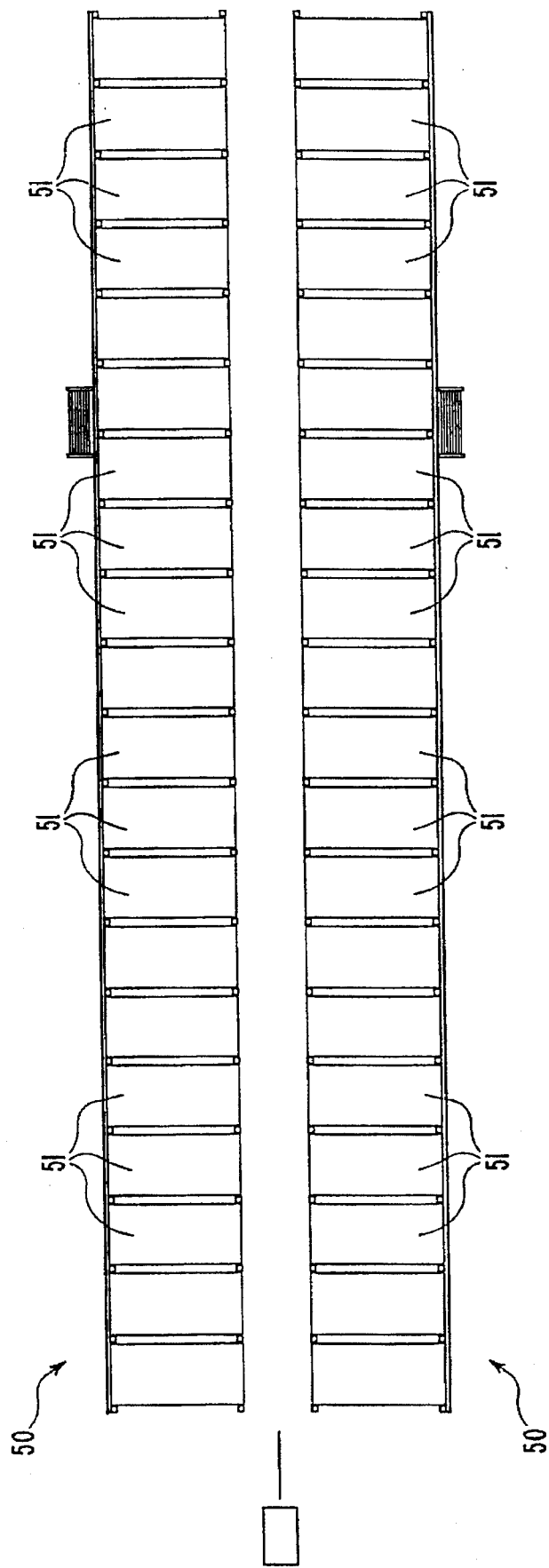

CASE PICKING SYSTEM

BACKGROUND OF THE INVENTION

1. Field

This invention relates to automated material handling systems. It is particularly directed to mechanized systems for receiving, storing, and delivering goods quickly and in a desired selected order.

2. State of the Art

There are widespread needs for material handling systems capable of receiving, storing and delivering goods in a selected order. Many such systems, often referred to as "order picking systems," have been developed. Such systems constitute means for reducing manual handling of goods; improving the accuracy of goods handling; increasing the volume of goods that can be handled; and reducing the number of injuries to workers.

Order picking systems are applied to a wide variety of circumstances and environments. In general, they may be regarded as involving the retrieval ("picking") of designated goods from various designated storage locations ("addresses") from which they are delivered to a remote accumulation center. Upon accumulation, the goods are sorted into individual lots or orders. A typical objective of an order picking system is to retrieve individual case lots of designated goods from diverse locations within a warehouse and to assemble (palletize) the retrieved cases into ranks and files in a plurality of layers stacked on a pallet. While many of the operations required for such systems have been mechanized, the delivery and organization of cases of different goods or styles of goods to the final assembly or palletizing stage of the delivered cases has generally involved considerable manual labor.

Material handling systems developed in the past have combined known devices, such as conveyer belts, empty pallet feeders, depalletizers, unscramblers, wrappers and similar apparatus. These systems have typically adopted a horizontal flow, rack/conveyor approach that has proven to be costly, complex, unreliable and difficult to maintain. These known systems are also generally incapable of meeting changing needs. Once installed, they have been unduly limited as to the amount of material that can be processed and the speed with which product can be delivered from storage to a pick-up location.

U.S. Pat. No. 4,621,745 to Grace discloses a mechanized carton picker configured as a vertically accumulating and dispensing apparatus for containers. Cartons, cases or other suitable containers are loaded by a feed conveyor discharging onto a supply conveyor that feeds the top of a tower. The containers are dispensed seriatim, as needed, from the bottom of the tower, e.g., onto a moving discharge conveyor belt. The vertical tower thus provides a vertical queue or stack of containers of a product in storage. The individual containers progress via tilting shelves from the top to the bottom of the queue as containers lower in the queue are dispensed. Additional containers are loaded at the top of the tower as required to maintain inventory.

The use of vertical storage systems has been well known as a means of achieving maximum use of storage space. For years, it has been common to use operator controlled fork lifts and cherry pickers to travel between banks of high rise storage shelves. An individual operating such equipment can place items on the storage shelves for storage and subsequently remove the items from the shelves for delivery to a collection location. While providing for efficient use of available storage space, the use of high rise shelving and manual placement of goods for storage and removal of the goods on a selected basis for delivery is slow and labor intensive. In addition, further labor is often required to consolidate the selected goods for efficient delivery to a pick-up location.

It is not uncommon for workers to make mistakes while placing, retrieving or consolidating the goods, or for workers to be injured in the performance of their jobs.

More recently, various proposals have been made for storage and distribution systems utilizing computers to control flow of goods both into storage and out for delivery, while maintaining accurate data on the availability of goods and their locations.

It has also become widely accepted, particularly in the grocery business, as well as in other businesses such as, for example, those dealing with soft goods, automotive supplies, parts supplies and many other types of products, to deliver the goods to a pick-up location on pallets. The delivery location may be a truck, box car or other transport system or may merely be a storage location where the goods await further handling and transport.

The pallets for a particular industry are generally essentially standardized in size and loading. In the grocery industry, for example, the pallets are most often rectangular and are typically forty inches wide by forty-eight inches long by five inches thick. Standard pallets of this size will conveniently and efficiently fit into and fill trucks, box cars, sea containers, etc. The pallets are generally loaded with cases containing the goods and with the cases arranged in layers. Each layer is arranged to be able to support another layer or layers, and a typical such pallet may support as many as forty to eighty cases. The manner of loading each pallet depends on the type of cases delivered and whether different case types need to be placed on a pallet in correspondingly different patterns.

When it is determined that goods are to be delivered to a pick-up or staging location, it is possible that the order placed for such goods may be for full pallets of one type of goods or full pallets of a number of different types of goods. The order may require pallets having specific layers dedicated to cases of respective types of goods or the order may require pallets having layers of cases of mixed types of goods. The orders for goods may include some full pallets of goods of one type or another, some pallets with different goods making up individual layers and for other pallets with mixed cases of goods within layers on the pallets.

In the past, computers have been used to determine order requirements and even to control delivery of goods to a location for storage and release of the goods for transport to a pick-up location. There has not heretofore been available any system capable of monitoring and controlling storage goods, storage replenishment as the goods are delivered from storage and the versatile delivery of the goods by full pallet. By "versatile delivery" is meant by pallet loads which are selectively loaded either by the same type goods, individual layers of different specified goods or different type goods in cases that are mixed within layers.

The development in recent years of mechanized and computer controlled robots having capabilities for selecting, picking up, transporting, and releasing selected goods of various types and in different patterns greatly increases the possibilities for mechanical handling of goods.

C&D Robotics of Beaumont, Tex. currently manufactures and markets robot units that are used in industry. Typical of the robot units currently marketed are open gantry units having a cantilevered axis and closed gantry units having a totally enclosed motion. C&D Robotics currently produces standard robot units having total load capacities, i.e. product carried, plus end effector used, of 120 to 350 pounds. Non-standard, structurally modified robot units are available to handle heavier loads, even exceeding 1,000 pounds.

The standard end effectors available for use with the C&D robotic units fall into a few general categories, for example: "fork and clamps," where bottom forks support the goods, while a top clamp steadies the goods for handling; "vacuum," where suction is produced either venturi action created using compressed air or by an integral blower with cups or platens, as required; "variable pitch vacuum," using vacuum cups that adjust under program control to handle a wide range of products; "top clamp," wherein parallel clamps are used on two or four sides of the product; and "hybrid," which comprises combinations or extensions of the other types.

U.S. Pat. No. 4,621,745 discloses a mechanized carton picker wherein vertical storage and dispensing apparatus is provided for the handling of containers of goods. Goods are loaded at the top of a tower and are selectively discharged from the bottom. The tower has a frame that defines first and second tower sections each supporting a number of vertically spaced shelf trays to support the containers placed on the trays when the tower is loaded. Each tray is mounted for cantilevered pivotal movement about a horizontal axis and is operated so that when a container is dispensed from a bottom shelf tray of one tower section, each higher tray of the tower sections, beginning at the bottom and progressing upward, one at a time, pivots to transfer its container to the next lower, upwardly tilted tray of the other tower section. The process is repeated until each container has been transferred to the next lower tray. As a container is loaded at the top of the tower, the shelf trays are operated to pass the container downwardly in zigzag fashion from one tray on one tower section to another tray on the other tower section until the container reaches the highest unloaded tray. This mechanized carton picker provides a means for efficient use of available space for storage purposes and a means for selective delivery of goods stored in the unit and is therefore well suited for use in the automated order picking system of the present invention.

A gantry robot, together with a mechanized carton picker tower and discharge output comprises a cell, forming a principal component of the present automated order picking system.

SUMMARY OF THE INVENTION

Generally, this invention provides an automated material handling system comprising a case storage and delivery system including means for receiving, storing and delivering cases of goods; a full layer storage, picking and delivery system for storing and delivering full layers of cases of goods; conveyor means for receiving both the cases of goods and the full layers of cases of goods from the case storage and delivery system and from the full layer storage, picking and delivery system, respectively; control means to pick cases of goods to be delivered by the case storage and delivery system and the full layer storage, picking and delivering system; and a palletizer receiving the cases of goods and the full layers of cases of goods from the conveyor means and placing the cases and the full layers of cases on pallets in selected patterns.

The case storage and delivery system may be vertically extended to receive and store cases in a vertical column or tower. Cases may then be dispensed from the vertical storage tower as appropriate.

This invention provides an automated order picking system that is assembled from readily available components. A basic component of the system is an assemblage referred to in this disclosure as a "cell." Each cell includes at least one tower, which may comprise a vertical storing and delivery system of the type disclosed in the aforementioned U.S. Pat. No. 4,621,745, in combination with a gantry robot. The cells are associated in the system with conveyers and other components, notably automatic palletizers, empty pallet feeders and wrapping machines, as needed to fit a particular application. The total system provides for rapid picking of selected goods, in selected case quantities, and the re-arrangement of the selected cases onto pallets destined for delivery to a pick-up location, which may be a customer or conveyance, such as a truck.

A typical system of this invention is organized to dedicate each tower of each cell used to receive and dispense containers of a single designated product or product type. Each tower provides storage and dispensing of a vertical column of containers and is capable of seriatim deposit of the containers from the lower end thereof onto a moving feeder belt. The system includes a plurality of towers corresponding in number to at least the number of distinct containers routinely dispensed and organized by the system. More than one tower may be dedicated to the storage and dispensing of the same distinct containers where demand for the goods of such containers generally exceeds the demand for goods of other distinct containers. By "distinct container" is meant a container of standard shape and dimensions, but containing specified goods different in nature or package from those contained by other distinct containers. Each tower dispenses containers onto a discharge conveyor of the cell containing such tower and the containers are then moved onto a conveyance system, such as a network of horizontal conveyors, in accordance with a program structured to deliver a predetermined population of containers, (corresponding to an order), to a pick-up or assembly location.

While the systems of this invention are adaptable to handle distinct containers of various configurations, it is described herein by particular reference to goods filled carton-type cases of various sizes and shapes. Typically, the system accommodates a multiplicity of cases of standardized dimensions. Generally, a standard number of cases containing a prescribed number of units of specific goods are delivered to a warehouse location on a pallet. Each pallet holds a number of layers of such cases, with the number of layers and the patterns of cases making up the layers depending on the nature of the cases. The cases of such a pallet are assigned to a specific cell of the system. The robot gantry of the cell functions to depalletize the cases, that is, to remove the cases from the pallet. The gantry picks up the cases and moves them to other components of the system which function to transport them, one-by-one, to the top of the tower component of the cell.

The system of this invention may be configured to deliver full pallets of selected cases of goods from a pallet rack system; to deliver full layers of cases of the goods to be palletized; and to alternatively or simultaneously organize, through the cells of the system, individual cases of goods to be placed in layers and palletized immediately before delivery of the goods to a pick-up or staging location. Organization of these layers is accomplished by management of the towers of a plurality of one or more cells by means of a programmable logic control system. While the control system may be implemented manually or mechanically, it is presently preferred to rely upon a management computer for this purpose. The computer controls the loading and dispensing of containers into and out of the towers of respective cells in accordance with an appropriate logic pattern which is inputted to the computer in response to data reflected by individual orders.

In operation, the manager computer receives orders for goods from respective customers, and subdivides ("breaks down") each such order into (1) full pallets of multiple layers of cases of goods ordered by the customer; (2) full layers of goods ordered by the customer; and (3) compatible cases of goods ordered by the customer that can be assembled into pallet layers, ideally such that full pallets can be assembled from these layers and, if appropriate, the segregated full layers. The manager computer provides the breakdown information to a programmable logic controller (PLC) and through the PLC controls a gantry full layer picking system; a gantry inventory replenishment system; a vertical storage and delivery system and one or more palletizers; together with the conveyor system necessary to carry replenishment inventory, cases of goods, unmodified full pallets, and modified full pallets.

The system also includes the use of counters to identify and count cases of goods placed in the towers; cases of goods released from the towers of the vertical storing and delivery system to the conveyor system; the total number of cases of goods clearing the vertical storing and delivery system on the conveyor system, prior to further dumping onto the conveyor system from the full layer picking, storing and delivery system; to count the cases delivered by the gantry full layer picking system; and to use the counts to control the gantry inventory replacement system in re-supply of the vertical storing and delivery system with cases of goods to be stored and delivered. The data accumulated by the counters are supplied to the PLC and are used to verify proper fulfillment of orders supplied to the PLC from the manager computer.

A preferred vertical storing and delivery system utilizes an expanded cell made up of a pair of rows of a number of towers of the type disclosed in the aforementioned U.S. Pat. No. 4,621,745, together with a top conveyor belt for distribution of goods to the towers in the pair of rows, a bottom conveyor for transport of goods away from the towers in the pair of rows and a gantry for delivering goods to each top conveyor.

Each palletizer in the system may also be controlled by the PLC so that as cases are delivered thereto they are palletized according to the pattern and loading instructions furnished to the PLC from the manager computer.

BRIEF DESCRIPTION OF THE DRAWINGS

In the drawings, which illustrate what is currently regarded as the best mode for carrying out the invention.

FIGS. 2, 2A and 2B show a top plan layout with a typical product assignment in an overall system according to another embodiment of the invention;

FIG. 3 is a schematic end elevation view of a typical case picking component of the invention;

FIG. 5 is an enlarged fragmentary portion, taken within the line 5—5 of FIG. 3;

FIG. 6 is a schematic top plan view of the case picking system component of FIG. 3;

DETAILED DESCRIPTION OF THE ILLUSTRATED EMBODIMENT

Figure 1:
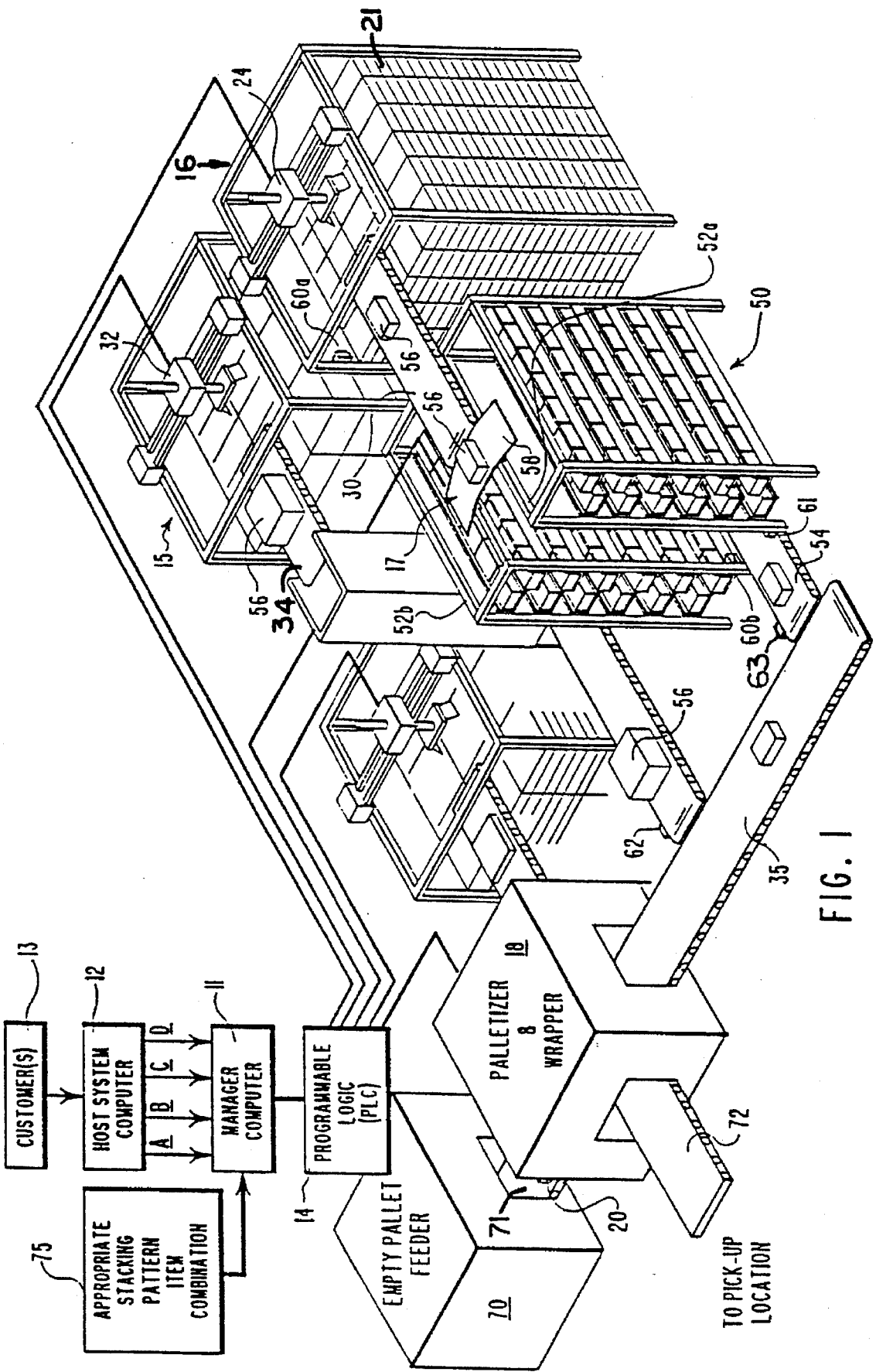
FIG. 1 is a pictorial diagram showing the general relationship of components of a material handling system of the invention.

The material handling system of the invention is shown generally and in pictorial form by FIG. 1. The material handling system includes a manager computer 11 that receives input from a host computer 12. The host computer is typically a house computer of an entity generating product orders or otherwise directing the handling of goods. The goods are stored at the site of the manager computer 11, and are packaged in cases ready for delivery.

Although a single host computer 11 is illustrated, a plurality of similar devices may communicate with the manager computer 12 in practice. A host computer 12 may be arranged to receive from any type and/or number of conventional input devices (not shown) orders placed by one or more customers 13. The host computer 12 then reorganizes each order into defined categories of goods corresponding to the categories available for supply. For example, in the soft drink industry, an order may be placed by a host computer 12 for cases of canned drinks A, cases of drinks bottled in non-returnable glass bottles B, and cases of drinks C bottled in plastic, disposable bottles. Such an order may be further complicated by specifying, for example, a number of cases of drinks D in a number of different beverage container sizes. Each order to the manager computer includes identity data, such as a customer number, product identification item codes and a total case count.

In appropriate circumstances, the host computer may be programmed to "round up" customer orders into full pallet layers of product, determine if "reverse picking" is necessary and determine if layers can be formed of different goods. It may further determine whether different goods can be layered on a pallet for the same or different customers. All of this organizational information is transmitted to the manager computer 11.

Figure 2B:
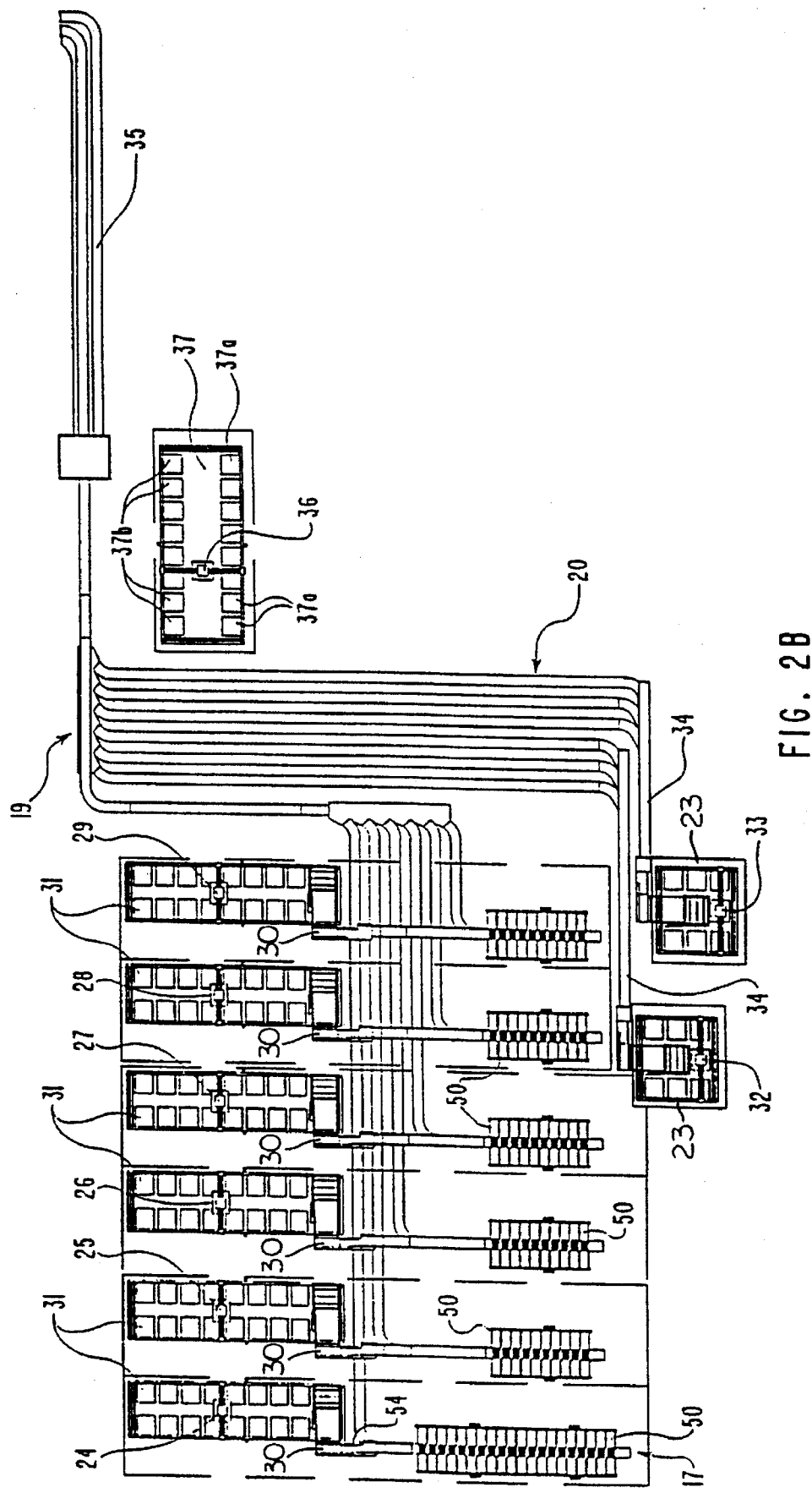
Figure 4:
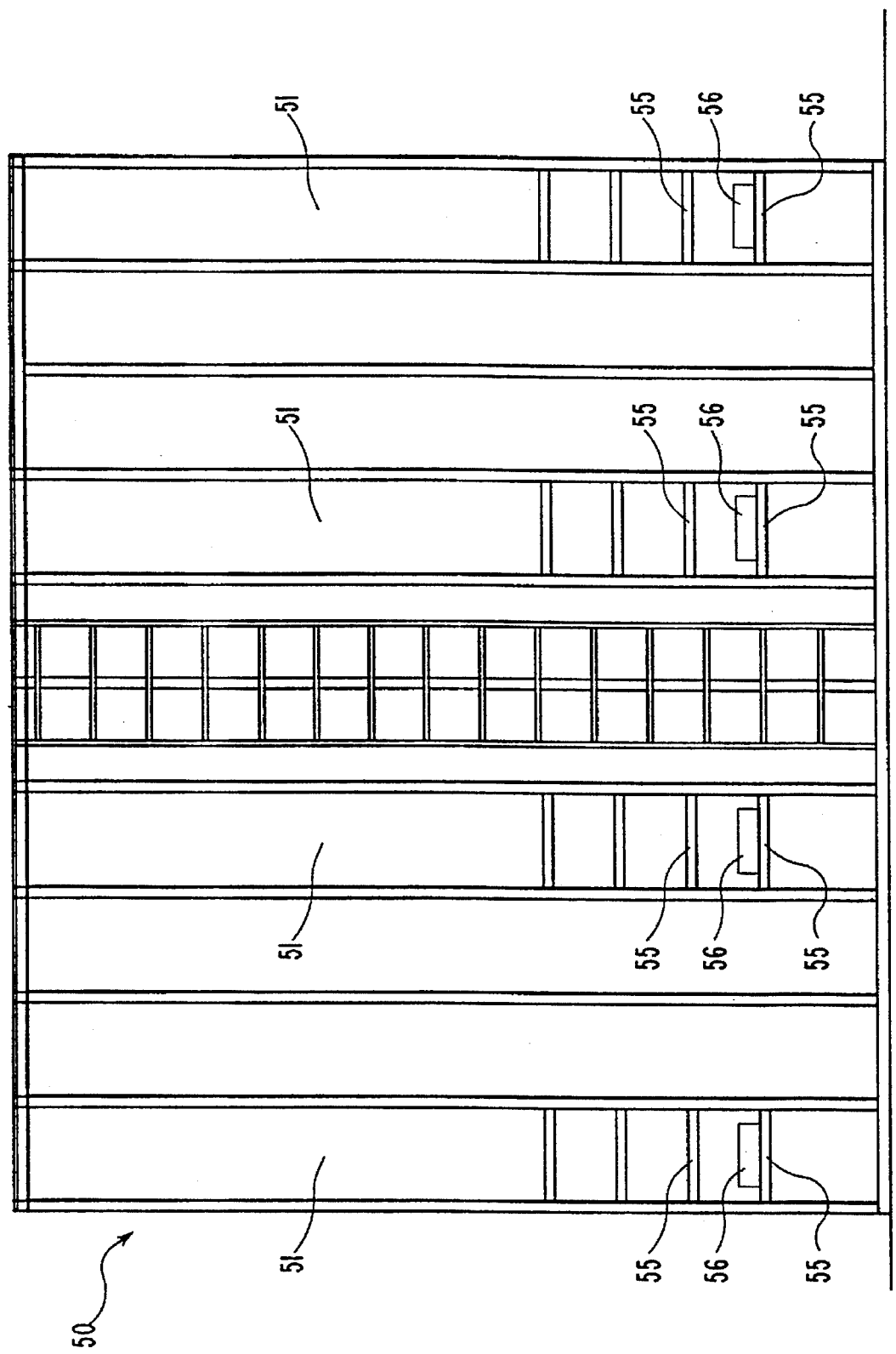
FIG. 4 is a schematic side elevation view of the case picking system component of FIG. 3.
Figure 9:
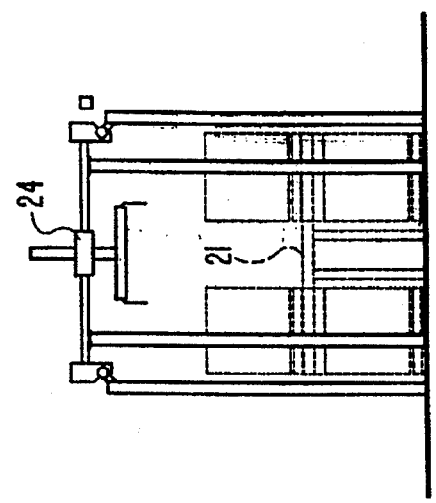
FIG. 9 is a schematic end elevation view of the gantry robot of FIG. 7.
Figure 8:
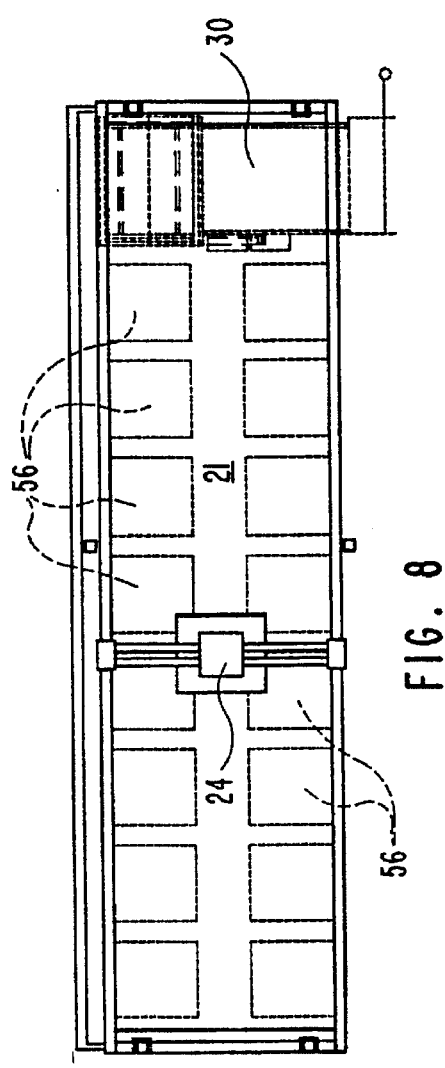
FIG. 8 is a schematic top plan view of the gantry robot of FIG. 7.
Figure 7:
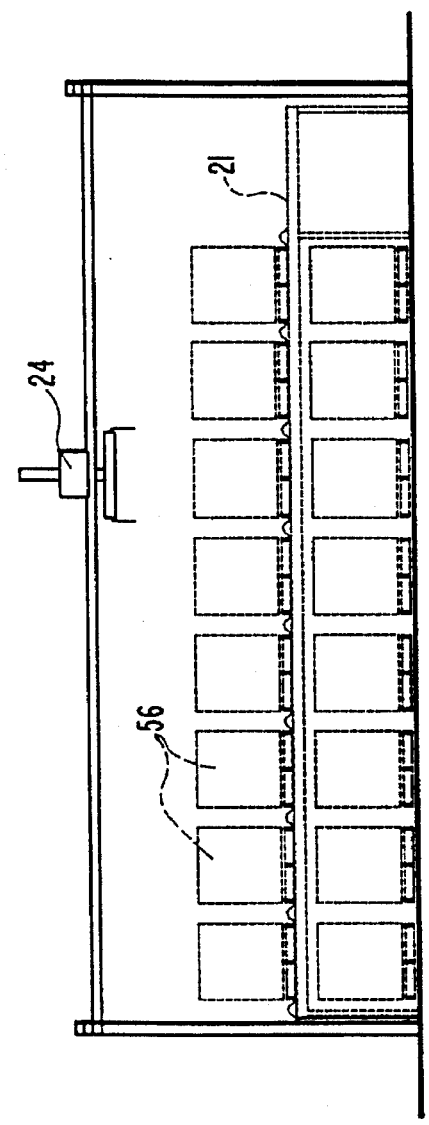
FIG. 7 is a schematic side elevation view of a typical gantry robot as used in the material handling system of the invention.

The manager computer 11 accepts the input from the host computer(s) 12 and utilizes the furnished data to control one or more programmable logic controller(s) 14 that direct(s) operation of a gantry full layer picking system, shown generally at 15, a gantry inventory replenishment system, shown generally at 16, a case storing and delivery system, shown generally at 17, a palletizer and wrapper 18 and a collection conveyor system, shown generally at 19 (FIG. 2A) and 20 (FIG. 2B). The pictorial relationship between FIG. 2A and 2B is illustrated in FIG. 2.

The gantry full layer picking system 15 and the gantry inventory replenishment system 16 each include at least one platform 21 on which pallets of goods are initially positioned. The goods may be placed on the platform using standard manually operated or automatically controlled forklifts, (not shown). A gantry robot, manufactured and marketed by C&D Robotics, has been found to be well suited for moving the goods from the storage platforms. Such robots are three axis in function, each with hybrid vacuum/seal clamp end effector, and conventionally available data highway plus interface and Programmable Automated Loader (PAL) motion controller.

In the embodiment of the invention shown in FIGS. 2A and 2B, as may be used in the soft drink industry, gantry robots 24–29 (FIG. 2B) each have an end effector designed to pick up individual cases of twelve ounce cans from a platform 31. Each of the robots has sixteen pickup locations and deposits onto a feed conveyor 30 that supplies the cases of cans to a storing and delivery system 17. The robots each pick up cases from pallets on platforms provided for the purpose and deposit onto the feed conveyor for cells of the case storage and supply system 17.

Typically, the end effector used to pick up, carry and release the cases of twelve ounce cans will be designed to carry cases comprising cans packaged as twenty-four loose cans stretch wrapped in a cardboard tray; as four six packs, loose in a cardboard tray; as two twelve packs enclosed in card stock covers and taped together; or as one twenty-four pack enclosed in card stock cover.

Gantry robots 32 and 33 of the gantry full layer picking system 15 are each provided with an end effector designed to pick up individual layers of cases of twelve ounce cans from a platform 23 and to deposit them on a feed conveyor 34 that then carries the layers of goods to one of a plurality of queuing conveyors 35.

Another gantry robot 36 of the gantry full layer picking system 15 also has an end effector to pick up layers of cases of twelve ounce cans from a platform 37 and has eight pick-up locations 37a and eight deposit locations 37b. The robot 36 will pick up full layers from pallets at the pick-up locations and will deposit those layers in assigned fashion on another pallet at the deposit locations. Layers are transferred in the order set forth by the manager computer until a full pallet of desired goods is ready for delivery to the conveyor system. It is not necessary that each pallet have the same number of cases or the same number of layers to be a "full" pallet. Thus, an appropriate "full" pallet may remain even after it has been stripped of one or more full layers. The partially stripped pallet may nevertheless be delivered to the conveyor system as a "full" pallet.

The PLC 14 controls the gantry robot 36 to remove a full layer of cases of goods from pallets at the pick-up locations 37a and to deposit them on empty pallets at the deposit locations 37b until full pallets of selected goods are achieved to be delivered to the conveyor system 19 by use of an automated forklift, or the like, not shown. The gantry robot 36 is also controlled by the PLC to remove full layers of cases of goods from a pallet, i.e. to "reverse pick," and to leave a "full" pallet of fewer layers that can then be delivered to the palletizer and wrapper 18 and ultimately to a pickup location.

Two gantry robots 38 and 39 of the gantry inventory replenishment system 16 are each provided with an end effector designed to pick up individual cases of non-returnable glass bottles from a platform 40. Robots 38 and 39 each have sixteen pickup locations on a platform 40 and each deposits onto a feed conveyor 30 for units of the storing and delivery system 17. The end effector used with the gantry robots 38 and 39 is designed to handle the non-returnable glass bottles, and will pick and carry a case of ten ounce, non-returnable glass bottles loose packed in a cardboard box; ten ounce bottles in six packs packaged in a cardboard box; sixteen ounce bottles loose in a cardboard box; sixteen ounce bottles in six packs packaged in a cardboard box; and twenty ounce bottles, loose packed in a cardboard box.

Two other gantry robots 41 and 42 of the gantry inventory replenishment system 16 are each provided with an end effector designed to pick up individual cases of plastic one liter and two liter bottles from a platform 43. Each of the robots 41 and 42 has sixteen pickup locations on the associated platform 43 and a discharge location onto a conveyor 30 providing feed of cases of goods to units of the case storage and delivery system 17. The end effector used with gantry robots 41 and 42 will handle the one- and two-liter plastic bottles packaged as ten one-liter bottles, Kister-wrapped in a cardboard tray, and six two-liter bottles, Kister-wrapped in a cardboard tray.

The case storage and delivery system, shown generally at 17, in FIGS. 2A and 2B, includes a number of vertically extending cells 50. The cells 50 preferably include towers of the type disclosed in U.S. Pat. No. 4,621,745 and made and sold by Jayson Concepts, Inc.

As best seen in FIG. 3, the cells 50 each include a row of towers 51, with each tower having spaced, facing tower sections 52a and 52b, a feed conveyor 30 above the space between adjacent rows of towers and a discharge conveyor 54 in the space between the bottoms of adjacent rows of towers. The feed conveyor 30 and discharge conveyor 54 are each common to as many of the towers as may make up a cell 50. Each tower 51 is preferably dedicated to storage and delivery of a particular type of goods and the end effectors of the gantry robots are configured to accommodate the goods delivered by such gantry robots to the cells.

The tower sections 52a and 52b are loaded from the conveyor 30 at the top and dispense from the bottom, under the control of the PLC, onto the discharge conveyor 54. Each of the tower sections 52a and 52b supports a vertical row of spaced apart shelf trays 55 which, in turn, support cases of goods 56 that are stacked on the trays, when the tower is loaded. The shelf trays 55 of each tower section face inwardly towards and are staggered relative to each other. Each tray is mounted for pivotal movement about a horizontal axis 57 and is operated as disclosed in U.S. Pat. No. 4,621,745, so that when a case is dispensed from a bottom shelf tray under control of the PLC, each higher tray beginning at the bottom and progressing rapidly upwardly one at a time pivots to transfer its case to the upwardly tilted next lower shelf tray, which then pivots to a central position. This process is repeated until each container has been transferred to the next lower shelf tray. As a case is loaded at the top of the tower, after a tower has been previously sufficiently emptied, the shelf trays are operated to pass the container downwardly in zigzag fashion from one tray to another until it reaches the highest unloaded shelf tray. This process is repeated until both tower sections are fully loaded.

The gantry robots 24–29 and 38, 39, 41 and 42, upon instructions from the PLC 14, each pick up individual cases 56 of goods stored on their associated platforms 31 (having been placed there in conventional fashion with manually operated or automated fork lifts, for example) and deliver them to their associated conveyor 30. Each conveyor 30 is also controlled by the PLC 14 and operates to position cases of goods placed thereon to be discharged by a conventional pusher assembly 58, also controlled by PLC 14, onto the proper column or columns of shelf trays in a tower section 52a. Preferably, each column of facing shelf trays will accommodate the cases of goods that will make up a full pallet. The PLC 14, based on data supplied by the customer, through the host system and manager computer selects the proper column of facing shelf trays to be moved to a discharge position. A case of goods is then discharged to the discharge conveyor 54. Each case above the discharged case then moves down to the next shelf tray, which shelf tray then moves to a storage position. As each tower empties, a signal is sent to the PLC 14 and the proper gantry robot is actuated to pick up cases of proper goods assigned to that tower from a platform and to deliver them onto the conveyor 30 of the associated cell 50 for replenishment of the depleted column.

Counters 60a and 60b are positioned at the feed end of conveyor 30 and at the bottom of each tower 51, respectively, to count the number of cases furnished to and released from the tower sections to the discharge conveyor 54. The counters send a signal indicative of the number of cases counted to the PLC 14 as a check against the number of cases that were to be released by the particular tower and to insure that a case does not remain "hung up" in the tower.

Another counter 61 is mounted on the frame of conveyor 54 to count cases on the conveyor and exiting each cell 50. Each counter 61 also sends a signal indicative of the cases counted to the PLC, where the count is checked against the total number of cases that the PLC had previously instructed the bank of cells to release for a particular customer order.

After each customer order has been verified, the counters are re-set to prepare them to count a next customer order.

Additional counters 62 and 63 are also provided on the conveyor system 19 and 20, respectively, to count the number of full layers of cases of goods placed on the conveyor system by the case storing and delivery system 17 and full pallets of cases of goods placed on the conveyor system by the gantry full layer picking system 15. Counter 62 sends signals indicative of the cases and pallets counted to the PLC 14 to be verified against signals sent by the PLC 14 to the gantry full layer picking system 15 and to complete verification of a customer order that has been previously broken down by the manager computer into "full" pallets, full layers and cases of goods.

The cases of goods from the vertical case storing and delivery system 17 deposited on conveyors 54 are moved to conveyor system 19 and full layers of goods from the gantry full layer picking system 15 are also delivered to conveyor system 19. The goods are then moved out to queuing conveyors 35 where they are held, to be fed in order, into a palletizer and wrapper 18 (or number of palletizers) where they are positioned in selected patterns on pallets fed to the palletizer and wrapper from an empty pallet feed 70, by a conveyor 71.

Additional "full" pallets, which may be pallets that have been reverse picked or built up, as previously described, are also fed to the palletizer 18 from the gantry full layer picking system by conveyor system 20. The conveyor system 20 also delivers full pallets directly from a storage system to the palletizer and wrapper 18.

The palletizer and wrapper 18, under control of the PLC 14, receives the product required for each customer order and assembles the order as one or more pallets for delivery to a pick-up or staging location (not shown) which may be a truck, sea container, boxcar or other structure. The assembled customer order may consist of straight pallets of goods, i.e., pallets with layers of cases of goods moved directly to the palletizer and wrapper 18 from storage by conveyor system 20, "full" pallets received from the full layer picking system 15, or full pallets assembled at the palletizer 18 from layers of goods supplied to conveyor means 19 from the full layer picking system 15, and/or from the cases of goods fed onto conveyors 54 and then onto the conveyor means 19, or from combinations of any of the full pallets, layers or cases, assembled as directed to the palletizer by the PLC 14. Each individual customer order arrives at the palletizer and wrapper 18 from the conveyor systems 19 and 20 and is palletized and wrapped before being discharged via conveyor 72 to a customer pick-up or staging location (not shown), before a next customer order is processed.

The palletizer and wrapper 18 arranges the cases and pallets received by signals from the PLC in accordance with a program 75 establishing an appropriate stacking pattern for each of the item combinations.

Reference herein to the details of the illustrated embodiment is by way of example only and is not intended to limit the scope of the appended claims which themselves recite those details regarded as important to the invention.

We claim:

1. An automated material handling system comprising:
    a case storage and delivery system including means for receiving, storing and delivering cases of goods;
    a full layer storage, picking and delivery system for storing and delivering full layers of cases of goods;
    conveyor means for receiving said cases of goods and said full layers of cases of goods from said case storage and delivery system and from said full layer storage, picking and delivery system;
    control means to select cases of goods to be delivered by said case storage and delivery system and layers of cases of goods to be conveyed from said full layer storage, picking and delivering system to said conveyor means; and
    a palletizer receiving said cases of goods and said full layers of cases of goods from said conveyor means and placing said cases and said full layers of cases on receiving pallets in selected patterns.

2. An automated material handling system as in claim 1, wherein the control means to select the cases of goods and full layers of cases of goods to be delivered includes:
    a manager computer receiving orders for the goods and generating commands for delivery of cases from the case storage and delivery system and generating commands for delivery of full layers of cases from the full layer storage, picking and delivery system; and
    a programmable logic controller receiving said commands from said manager computer and controlling means for delivering cases from the case storage and delivery system to the conveyor means, and controlling means for delivering full layers of cases from the full layer storage, picking and delivery system to the conveyor means.

3. An automated material handling system as in claim 2, wherein the case storage and delivery system is a vertically extending system and wherein the means for receiving, storing and delivering cases of goods includes:
    at least one cell having at least one tower with a pair of spaced apart, facing tower sections, each said tower section having pivoting shelves thereon on which cases of goods are positioned for storage and delivery in response to tilting of said shelves;
    feed conveyor means feeding cases of goods to the tops of the tower sections; and
    discharge conveyor means receiving selected cases of goods from the bottom of a tower section.

4. An automated material handling system as in claim 3, wherein the case storage and delivery system includes a gantry robot controlled by the programmable logic controller to pick up cases of goods and to deliver them to the feed conveyor means.

5. An automated material handling system as in claim 4, further including a gantry robot controlled by the programmable logic controller to pick up layers of cases of goods and to deliver them to the conveyor means.

6. An automated material handling system as in claim 5, further including:

first counter means for counting cases discharged from the bottom of a tower section and for sending a signal indicative of said count to the programmable logic controller; and second counter means for counting cases carried by said feed conveyor means from the case storage and delivery system and for sending a signal indicative of said count to the programmable logic controller.

7. An automated material handling system as in claim 6, further including third counter means positioned to count cases of goods discharged from the full layer picking, storage and delivery system to the conveyor means and for sending a signal indicative of said count to the programmable logic controller.

8. An automated material handling system as in claim 7, wherein goods of different nature are assigned to different towers of the vertically extending storage and delivery system by the programmable logic controller.

9. An automated material handling system as in claim 3, wherein goods of different nature are assigned to different towers of the vertically extending system by the programmable logic controller.

10. An automated material handling system as in claim 7, further including:

means controlled by the programmable logic controller for supplying modified pallets of cases of the goods to the palletizer, said means adding layers of cases of goods to and removing layers of cases of goods from pallets of cases of goods to make said modified pallets according to signals from said programmable logic controller.

11. An automated material handling system as in claim 10, further including:

means directed by the programmable logic controller for supplying full pallets of cases of the goods to the palletizer.

12. An automated material handling system as in claim 2, wherein the case storage and delivery system is a vertically extending system.

13. An automated material handling system as in claim 12, wherein the case storage and delivery system includes:

at least one cell having at least one tower;

feed conveyor means feeding cases of goods to each said tower; and discharge conveyor means receiving selected cases of goods from the bottom of each said tower and delivering said selected cases of goods to said conveyor means.

14. An automated material handling system as in claim 13, wherein goods of different nature are assigned to different towers of the vertically extending system by a programmable logic controller.

15. An automated material handling system as in claim 13, wherein the case storage and delivery system includes a gantry robot controlled by the programmable logic controller to pick up cases of goods and to deliver them to the feed conveyor means.

16. An automated material handling system as in claim 15, further including a gantry robot controlled by the programmable logic controller to pick up layers of cases of goods and to deliver them to the conveyor means.

17. An automated material handling system as in claim 16, further including:

first counter means for counting cases discharged from the bottom of a tower and for sending a signal indicative of said count to the programmable logic controller; and second counter means for counting cases carried by said feed conveyor means from the case storage and delivery system and for sending a signal indicative of said count to the programmable logic controller.

18. An automated material handling system as in claim 17, further including third counter means positioned to count cases of goods discharged from the full layer picking, storage and delivery system to the conveyor means and for sending a signal indicative of said count to the programmable logic controller.

19. An automated material handling system as in claim 18, further including:

means controlled by the programmable logic controller for supplying modified pallets of cases of the goods to the palletizer, said means adding layers of cases of goods to and removing layers of cases of goods from pallets of cases of goods according to signals from said programmable logic controller to make said modified pallets.

20. An automated material handling system as in claim 19, further including:

means directed by the programmable logic controller for supplying full pallets of cases of the goods to the palletizer.

21. An automated material handling system as in claim 18, wherein goods of different nature are assigned to different towers of the vertically extending storage and delivery system by the programmable logic controller.

22. An automated material handling system comprising:

a case storage and delivery system for receiving, storing and delivering cases of goods, said case storage and delivery system including a tower to receive cases of goods at a top thereof, to store said cases of goods and to deliver said goods from a bottom thereof and a gantry means for picking up said cases of goods from a storage location and for transporting said cases to the top of the tower;

conveyor means to receive said cases of goods discharged from said tower;

control means to pick up and transport the cases of goods to be discharged from said tower to said conveyor means;

a palletizer receiving said cases of goods from said conveyor means and placing said cases in full layers of cases on pallets in selected patterns;

a full layer storage, picking and delivery system for storing and delivering full layers of cases of goods, said full layer storage, picking and delivery system including a gantry, storage means for pallets having layers of cases of goods thereon and conveyor means receiving said full layers of cases of goods and transporting said full layers to said palletizer to be placed on pallets in selected patterns; and wherein the control means operates said gantry to pick up and transport full layers of cases of said goods from said storage means and to deliver them to said conveyor means.

23. An automated material handling system as in claim 22, further including:

a modified pallet storage, picking and delivery system for storing and delivering full pallets of cases of goods, said modified pallet storage, picking and delivery system including a gantry for adding layers of cases of goods to and removing layers of cases of goods from pallets of cases of goods to make modified pallets and conveyor means receiving said modified pallets and transporting said modified pallets to said palletizer; and wherein the control means operates said gantry to add layers of goods to or to remove layers of goods from said pallets of goods and to deliver said modified pallets to said conveyor means.

24. An automated material handling system as in claim 23, further including:

means to deliver full pallets of cases of goods from a storage area to the palletizer to be combined with other goods by the palletizer under the control of a programmable logic controller to make a customer order supplied to said programmable logic controller through a manager computer.

* * * * *